(12) United States Patent
Srivastava et al.

(10) Patent No.: US 10,467,454 B2
(45) Date of Patent: Nov. 5, 2019

(54) SYNCHRONIZATION OF IMAGE DATA FROM MULTIPLE THREE-DIMENSIONAL CAMERAS FOR IMAGE RECOGNITION

(71) Applicant: Mashgin Inc., Mountain View, CA (US)

(72) Inventors: Abhinai Srivastava, Palo Alto, CA (US); Mukul Dhankhar, Palo Alto, CA (US)

(73) Assignee: Mashgin Inc., Palo Alto, CA (US)

( * ) Notice: Subject to any disclaimer, the term of this patent is extended or adjusted under 35 U.S.C. 154(b) by 99 days.

(21) Appl. No.: 15/497,730

(22) Filed: Apr. 26, 2017

(65) Prior Publication Data
US 2018/0314877 A1    Nov. 1, 2018

(51) Int. Cl.
*G06K 9/00* (2006.01)
*G06K 9/32* (2006.01)
(Continued)

(52) U.S. Cl.
CPC ........ *G06K 9/00201* (2013.01); *G01B 11/245* (2013.01); *G06K 9/00214* (2013.01); (Continued)

(58) Field of Classification Search
CPC ....... G06K 9/00201; G06K 2009/3225; G06K 2209/17; G06K 2209/401; G06K 9/00214;
(Continued)

(56) References Cited

U.S. PATENT DOCUMENTS 6,295,367 B1  9/2001 Crabtree et al.
6,990,228 B1  1/2006 Wiles et al.
(Continued)

FOREIGN PATENT DOCUMENTS

DE  19536294    4/1997
DE  19536294 A1 * 4/1997  ........... G01B 11/002
(Continued)

OTHER PUBLICATIONS

"International Application Serial No. PCT US2018 022612, International Search Report dated Jun. 8, 2018", 2 pgs.
(Continued)

*Primary Examiner* — Ayman A Abaza
(74) *Attorney, Agent, or Firm* — Jeffrey Schox; Diana Lin

(57) ABSTRACT

Methods, systems, and computer programs are presented for object recognition performed by electronic devices. One method includes an operation for capturing three-dimensional (3D) images of a region over a surface using 3D cameras, the surface having a pattern and each 3D camera defining a respective camera coordinate system. For each camera, the 3D image is analyzed to identify a location of the pattern indicating an origin of a common coordinate system, and a coordinate transformation function is defined to convert data to the common coordinate system. Each 3D camera captures a 3D object image of an object on the surface that includes 3D object data. The 3D object data is transformed to the common coordinate system to obtain transformed 3D object data. The 3D object data is combined to obtain a composite 3D object data, and object recognition of the object is performed based on the composite 3D object data.

23 Claims, 10 Drawing Sheets

(51) Int. Cl.

| | | |
|---|---|---|
| *H04N 13/243* | (2018.01) | |
| *H04N 13/25* | (2018.01) | |
| *H04N 13/296* | (2018.01) | |
| *G01B 11/245* | (2006.01) | |
| *G07G 1/00* | (2006.01) | |
| *G06Q 20/20* | (2012.01) | |
| *H04N 13/254* | (2018.01) | |
| *G06T 7/55* | (2017.01) | |
| *G03B 37/04* | (2006.01) | |

(52) U.S. Cl.
CPC ......... *G06K 9/3216* (2013.01); *G06Q 20/208* (2013.01); *G06T 7/55* (2017.01); *G07G 1/0063* (2013.01); *H04N 13/243* (2018.05); *H04N 13/25* (2018.05); *H04N 13/254* (2018.05); *H04N 13/296* (2018.05); *G01B 2210/52* (2013.01); *G03B 37/04* (2013.01); *G06K 2009/3225* (2013.01); *G06K 2209/17* (2013.01); *G06K 2209/401* (2013.01); *H04N 2213/001* (2013.01)

(58) Field of Classification Search
CPC .... G06K 9/3216; H04N 13/296; H04N 13/25; H04N 13/254; H04N 2213/001; G06T 7/55; G01B 11/245; G01B 2210/52; G06Q 20/208; G07G 1/0063; G03B 37/04
USPC .......................................................... 348/48
See application file for complete search history.

(56) References Cited

U.S. PATENT DOCUMENTS

| | | | |
|---|---|---|---|
| 9,258,550 B1 | 2/2016 | Sieracki et al. | |
| 9,327,406 B1 | 5/2016 | Hinterstoisser et al. | |
| 2005/0052535 A1 | 3/2005 | Hamadi | |
| 2005/0088529 A1* | 4/2005 | Geng .................. | A61B 5/1077 348/207.99 |
| 2005/0163382 A1 | 7/2005 | Herley | |
| 2005/0189411 A1 | 9/2005 | Ostrowski et al. | |
| 2006/0043174 A1 | 3/2006 | Banavar et al. | |
| 2006/0208169 A1* | 9/2006 | Breed .................. | B60N 2/002 250/221 |
| 2008/0252985 A1 | 10/2008 | Zhu et al. | |
| 2009/0059270 A1* | 3/2009 | Opalach .................. | G06K 9/00 358/1.15 |
| 2009/0268967 A1* | 10/2009 | Simon .................. | G06K 9/6211 382/195 |
| 2010/0059589 A1 | 3/2010 | Goncalves et al. | |
| 2010/0166294 A1 | 7/2010 | Marrion et al. | |
| 2010/0217678 A1 | 8/2010 | Goncalves | |
| 2010/0232681 A1 | 9/2010 | Fujieda et al. | |
| 2013/0010081 A1 | 1/2013 | Tenney | |
| 2013/0223673 A1 | 8/2013 | Davis et al. | |
| 2013/0314541 A1 | 11/2013 | Lord et al. | |
| 2014/0034731 A1 | 2/2014 | Gao et al. | |
| 2014/0036630 A1 | 2/2014 | Herwig | |
| 2015/0009214 A1 | 1/2015 | Lee et al. | |
| 2015/0023555 A1 | 1/2015 | Okamura et al. | |
| 2015/0066201 A1 | 3/2015 | Wubbena et al. | |
| 2015/0109451 A1* | 4/2015 | Dhankhar .......... | G06Q 30/0641 348/150 |
| 2016/0063821 A1 | 3/2016 | Macintosh et al. | |
| 2016/0110913 A1* | 4/2016 | Kosoy .................. | G06T 3/0068 382/154 |
| 2016/0269714 A1* | 9/2016 | Rhemann ........... | G06K 9/00892 |
| 2016/0364634 A1* | 12/2016 | Davis ...................... | G06K 9/78 |
| 2017/0054965 A1 | 2/2017 | Raab ........................ | G01C 11/02 |
| 2017/0278308 A1* | 9/2017 | Bleiweiss ............... | G06T 19/20 |
| 2018/0103209 A1* | 4/2018 | Fischler ............. | G06F 3/04815 |
| 2018/0314877 A1 | 11/2018 | Srivastava et al. | |

FOREIGN PATENT DOCUMENTS

| | | |
|---|---|---|
| DE | 102014111656 | 2/2016 |
| JP | 2009042082 | 2/2009 |
| JP | 2013186548 A | 9/2013 |
| WO | WO-2012128754 A1 | 9/2012 |
| WO | WO-2018200090 A1 | 11/2018 |

OTHER PUBLICATIONS

"International Application Serial No. PCT US2018 022612, Written Opinion dated Jun. 8, 2018", 5 pgs.
"International Application Serial No. PCT US2018 022644, International Search Report dated Jun. 7, 2018", 2 pgs.
"International Application Serial No. PCT US2018 022644, Written Opinion dated Jun. 7, 2018", 5 pgs.
"International Application Serial No. PCT US2018 023132, International Search Report dated Jun. 8, 2018", 2 pgs.
"International Application Serial No. PCT US2018 023132, Written Opinion dated Jun. 8, 2018", 6 pgs.
"European Application Serial No. 18161853.9, Extended European Search Report dated Sep. 19, 2018", 8 pgs.
"U.S. Appl. No. 14/517,634, Examiner Interview Summary dated Nov. 28, 2017", 2 pgs.
"U.S. Appl. No. 14/517,634, Final Office Action dated Jul. 21, 2016", 15 pgs.
"U.S. Appl. No. 14/517,634, Final Office Action dated Oct. 18, 2017", 15 pgs.
"U.S. Appl. No. 14/517,634, Non Final Office Action dated Jan. 5, 2016", 18 pgs.
"U.S. Appl. No. 14/517,634, Non Final Office Action dated Mar. 13, 2017", 17 pgs.
"U.S. Appl. No. 14/517,634, Non Final Office Action dated May 15, 2018", 16 pgs.
"U.S. Appl. No. 14/517,634, Response filed Jul. 5, 2016 to Non Final Office Action dated Jan. 5, 2016", 13 pgs.
"U.S. Appl. No. 14/517,634, Response filed Jul. 11, 2017 to Non Final Office Action dated Mar. 13, 2017", 13 pgs.
"U.S. Appl. No. 14/517,634, Response filed Oct. 21, 2016 to Final Office Action dated Jul. 21, 2016", 13 pgs.
"U.S. Appl. No. 14/517,634, Response filed Nov. 27, 2017 to Final Office Action dated Oct. 18, 2017", 14 pgs.
"U.S. Appl. No. 14/517,634, Response Filed Aug. 15, 2018 to Non Final Office Action dated May 15, 2018", 18 pgs.
"European Application Serial No. 18161854.7, Extended European Search Report dated Oct. 9, 2018", 8 pgs.
"European Application Serial No. 18161856.2, Partial European search report dated Oct. 22, 2018", 14 pgs.

* cited by examiner

US 10,467,454 B2

SYNCHRONIZATION OF IMAGE DATA FROM MULTIPLE THREE-DIMENSIONAL CAMERAS FOR IMAGE RECOGNITION

TECHNICAL FIELD

The subject matter disclosed herein generally relates to methods, systems, and programs for object recognition and, more particularly, methods, systems, and computer programs for object recognition using multiple cameras.

BACKGROUND

Visually recognizing objects is one of those tasks that is very simple for humans but very difficult for machines. Some solutions for visual recognition require that the object is in a very specific position, limit the number of objects that may be recognized, or require that a distinctive mark be placed on the object, such as multi-line barcodes or matrix barcodes.

But these solutions do not solve the general problem of quick recognition of any object from a large number of possible objects in an uncontrolled environment where the objects may be situated in any position, such as objects placed on a checkout counter.

BRIEF DESCRIPTION OF THE DRAWINGS

Various ones of the appended drawings merely illustrate example embodiments of the present disclosure and cannot be considered as limiting its scope.

DETAILED DESCRIPTION

Figure 1:
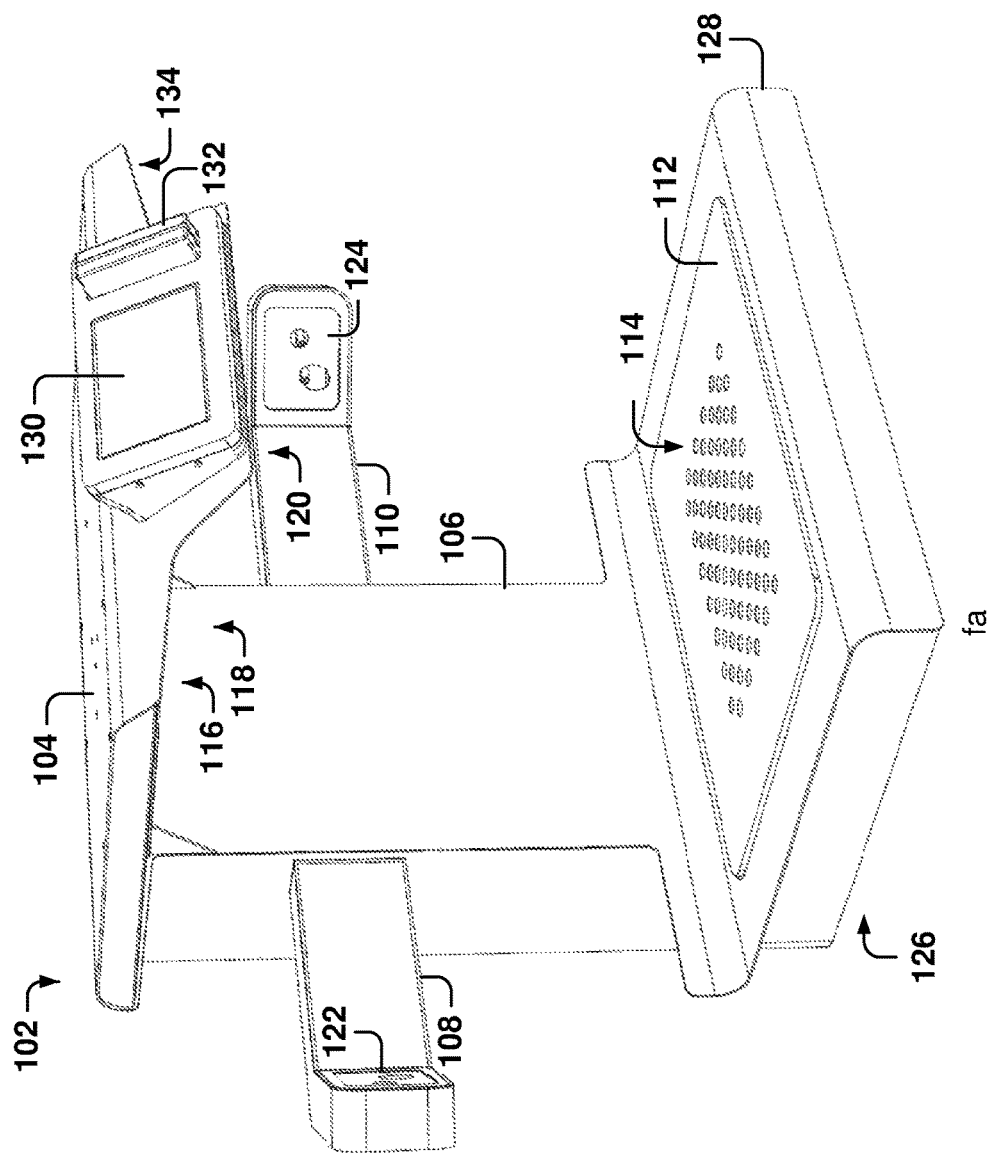
FIG. 1 illustrates an object recognition system, according to one example embodiment.

Example methods, systems, and computer programs are directed to object recognition performed by electronic devices. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Embodiments provide technical solutions for recognizing objects in a controlled environment where the objects may be situated in any position, such as objects placed on a checkout counter at the grocery store or at a cafeteria. In order to better recognize the objects, multiple three-dimensional (3D) cameras may be used to capture the object from different angles. This way, it is easier to identify the object, such as when a characteristic that uniquely defines the object may be situated in different positions (e.g., name of the brand of cereal or the name of a drink in an aluminum can).

Instead of trying to identify the object by examining the image from each camera separately, a model is created of the object by combining the image information from two or more 3D cameras. This way, the model includes more information about the object than the information obtained by any of the cameras alone. The use of 3D cameras allows the creation of a three-dimensional model of the object. Once the 3D model is created, the 3D model is used to identify the object utilizing a machine-learning algorithm.

In order to combine the image information from the plurality of cameras, the system is calibrated to be able to relate the information obtained from each camera to a common framework. In some example embodiments, a known pattern on a surface is used to correlate the positions and angles of the cameras to construct a common coordinate system. Since ambient conditions may change often (e.g., change of illumination, slight movement of the camera, etc.), the system continuously recalibrates the cameras to avoid losing information synchronicity.

One general aspect includes a method including an operation for capturing 3D images of a region over a surface by a plurality of 3D cameras. The surface has a pattern and each 3D camera from the plurality of 3D cameras defines a camera coordinate system. The method also includes analyzing, for each camera, the 3D image to identify a location of the pattern that indicates an origin of a common coordinate system shared by the 3D cameras. The method also includes defining, for each camera, a coordinate transformation function to convert data from the 3D image to the common coordinate system. Each of the plurality of 3D cameras captures a 3D object image of an object on the surface, with the 3D object image including 3D object data. The method also includes transforming, for the captured 3D object images, the 3D object data to the common coordinate system to obtain transformed 3D object data. The method also includes operations for combining the transformed 3D object data from the captured 3D object images to obtain a composite 3D object data and for performing object recognition of the object on the surface based on the composite 3D object data.

One general aspect includes a system including a surface having a pattern, a plurality of 3D cameras for capturing 3D images of a region over the surface, a memory including instructions, and one or more computer processors. Each 3D camera from the plurality of 3D cameras defines a respective camera coordinate system. The instructions, when executed by the one or more computer processors, cause the one or more computer processors to perform operations including: analyzing the 3D image to identify a location of the pattern that indicates an origin of a common coordinate system shared by the 3D cameras; for each camera, defining a coordinate transformation function to convert data from the 3D image to the common coordinate system, where each of the plurality of 3D cameras are configured for capturing a 3D object image of an object on the surface, with the 3D object image including 3D object data; for the captured 3D object images, transforming the 3D object data to the common coordinate system to obtain transformed 3D object data; combining the transformed 3D object data from the captured 3D object images to obtain a composite 3D object data; and performing object recognition of the object on the surface based on the composite 3D object data.

One general aspect includes a non-transitory machine-readable storage medium including instructions that, when executed by a machine, cause the machine to perform operations including: capturing 3D images of a region over a surface by a plurality of 3D cameras, the surface having a pattern, with each 3D camera from the plurality of 3D cameras defining a camera coordinate system; for each camera, analyzing the 3D image to identify a location of the pattern that indicates an origin of a common coordinate system shared by the 3D cameras; for each camera, defining a coordinate transformation function to convert data from the 3D image to the common coordinate system; capturing, by each of the plurality of 3D cameras, a 3D object image of an object on the surface, with the 3D object image including 3D object data; for the captured 3D object images, transforming the 3D object data to the common coordinate system to obtain transformed 3D object data; combining the transformed 3D object data from the captured 3D object images to obtain a composite 3D object data; and performing object recognition of the object on the surface based on the composite 3D object data.

FIG. 1 illustrates an object recognition system 102, according to one example embodiment. Some embodiments are disclosed in the context of an automated object recognition for a checkout system, e.g., in a cafeteria or a grocery counter, but the principles for object recognition may be utilized in other scenarios that may benefit from visually recognizing objects. Examples of such scenarios may include, but are not limited to, self-checkout of products by customers in supermarkets, restaurants, or coffee shops, multi-product packaging of diversified products in a packaging plant, product quality control in a manufacturing plant, advanced driver assistance systems such as automatic parking systems, public surveillance systems, and automated teller machines (ATMs).

The object recognition system 102 may include a base 128, a post section 106 on one side of the base 128, and a top section 104 above the post section 106. On the base 128, a tray 112 is used for supporting objects during the object recognition operations, and a scale 126 under the tray 112 may be used for weighing items. A first wingspan section 108 and a second wingspan section 110 are connected to the post section 106 and extend outwards to hold 3D cameras 122 and 124 and provide additional viewing angles for the objects on the tray 112, which is helpful for capturing details on the sides of the objects placed on tray 112.

Additional 3D cameras 116, 118, and 120 are positioned on the bottom surface of the top section 104. In some example embodiments, camera 116 and camera 118 are of different types and although they may be situated near each other, they provide different visual information based on the 3D technology utilized. Camera 120 is positioned towards the front of the top section 104, underneath the display 130, which is used to present user interfaces, such as user interfaces for configuring the object recognition system 102 or for presenting messages to users on the checkout counter.

The object recognition system 102 further includes a card reader 132 for receiving credit card information. Although a stripe card reader is illustrated, the card reader may also collect credit card information in other ways, such as a credit card chip reader or an interface to obtain payment information from a smart phone.

An illumination device 130 (e.g., compact fluorescent tubes, bulbs, light emitting diodes, etc.) may be configured to substantially illuminate the objects for recognition. A pattern 114 defined on the tray 112 is utilized for calibrating the cameras used for object recognition. The calibration pattern 114 may include various colors such as red, green, blue, white, black and their shades or combinations, and the calibration pattern 114 may be in any shape such as squares, color wheel or any other kind of shape into the base 128.

It is noted that the embodiments illustrated in FIG. 1 are examples and do not describe every possible embodiment. Other embodiments may have different shapes, place cameras in different positions, place illumination sources in different positions, and so forth. The embodiments illustrated in FIG. 1 should therefore not be interpreted to be exclusive or limiting, but rather illustrative.

Figure 2:
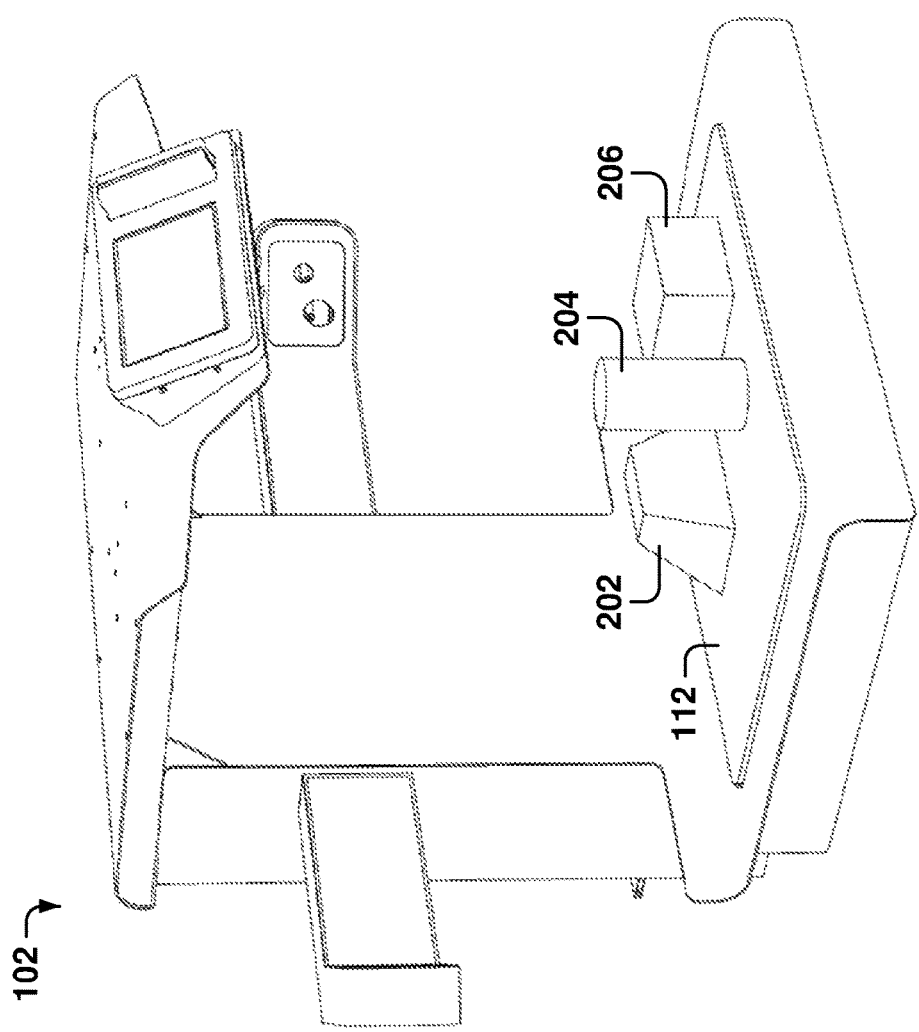
FIG. 2 illustrates the placement of objects for recognition, according to some example embodiments.

FIG. 2 illustrates the placement of objects for recognition, according to some example embodiments. During object recognition, objects are placed on the tray 112, such as the illustrated objects 202, 204, and 206, and the object recognition system 102 takes 3D images of the objects on the tray.

More than one object at a time maybe recognized, and if more than one object is present, the object recognition system 102 creates separate 3D models for each of the objects before they are submitted to an object recognition program. Further, the objects do not have to be placed on a predetermined location of the tray 112, with a predetermined orientation (e.g., standing on the side or standing on the base), or with a bar code aiming in a certain direction. The system does not rely on barcodes to recognize the objects, but rather the system analyzes the shape, color, and dimensions of the object to determine its identity, although if a barcode is detected, the barcode may also be used for recognition.

Figure 3:
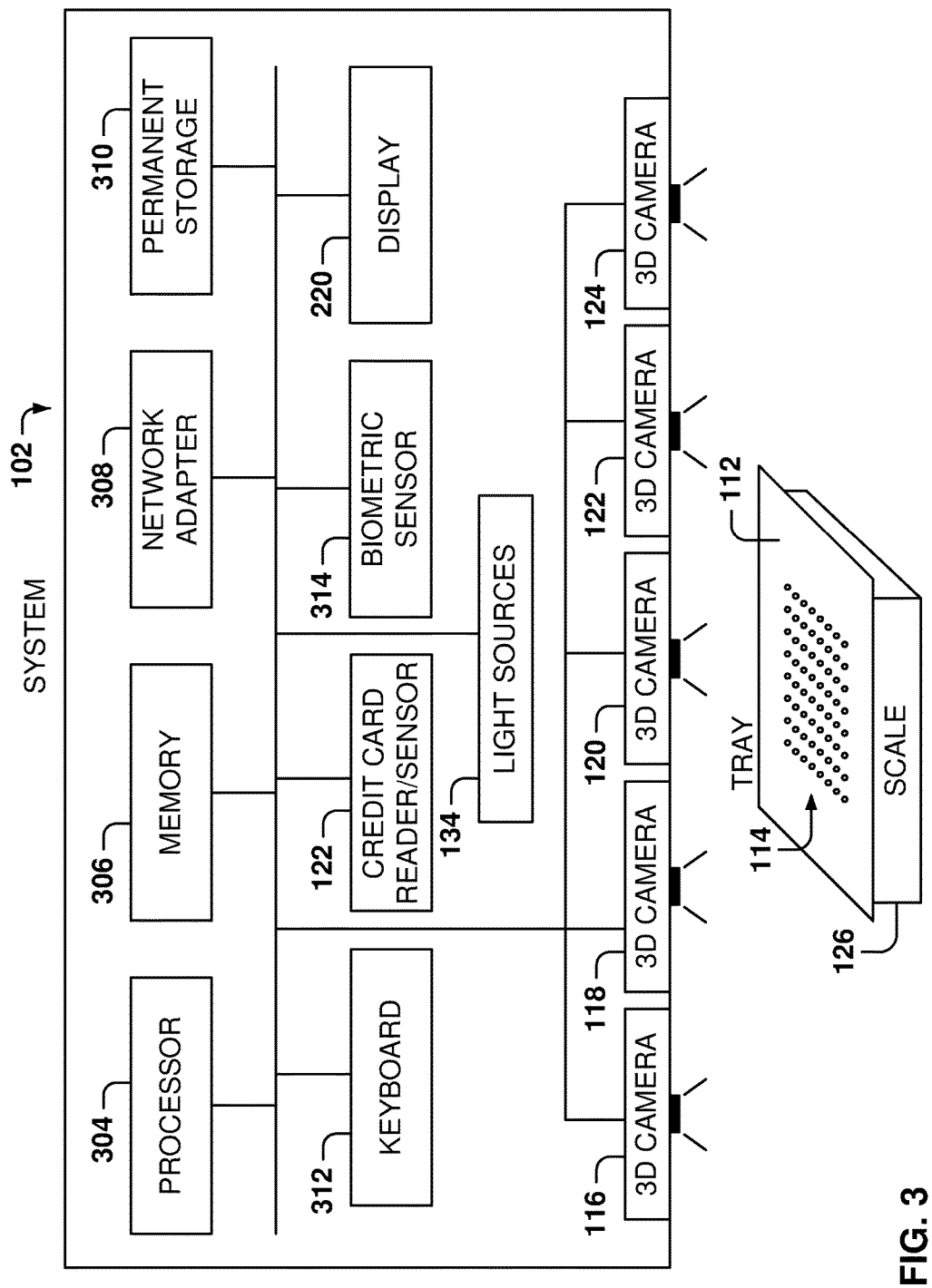
FIG. 3 illustrates the components of the system for object recognition, according to an example embodiment.

FIG. 3 illustrates the components of the object recognition system 102, according to an example embodiment. In some example embodiments, the object recognition system 102 includes a processor 304 for executing computer instructions of the programs described herein, a memory 306 for storing digital data (e.g., image capture data), a network adapter 308, and permanent storage 310. The network adapter 308 provides wired or wireless communications to connect the object recognition system 102 to a network (e.g., the Internet) or to other devices, such as user smart phones, tablets, and the like. The network adapter 308 may support standard Internet protocols (e.g., TCP/IP, UDP, 802.x) and other protocols for local communications, such as Bluetooth®, Wi-Fi®, infrared or ultrasonic devices, credit card protocols, Body Area Network, and so forth. The permanent storage 310 may store computer programs or computer data, such as 3D object models and system configuration parameters.

The object recognition system 102 further includes a keyboard 312, a credit card reader/sensor 122, one or more biometric sensors 314, one or more displays 220, and one or more light sources 134. The keyboard 312 may be used to enter data, such as configuration data or item descriptions. The credit card reader/sensor 122 is used for reading credit card information, which may be transmitted to a remote location via network adapter 308. The biometric sensor 314 is used to capture user information, such as a fingerprint or a retina scan. One or more displays 220 are used to present information, such as item name, item description, item price, item weight, total due, and the like. The one or more light sources 134 may be distributed across a certain volume in order to provide adequate illumination to objects placed in the volume of interest for recognizing the objects (e.g., over tray 112).

The object recognition system 102 further includes a plurality of 3D cameras 116, 118, 120, 122, and 124, the tray 112, and a scale 126 for weighing items placed on the tray 112. The 3D cameras may be of different types, such as a stereo camera, a structured light camera, a range camera, and so forth. Different types of cameras may be used simultaneously because the calibration process enables transforming the data from all of the cameras into a compatible format to build 3D object models.

In general, each type of 3D camera has strengths and weaknesses. By combining at least two of the different types of 3D cameras, it is possible to leverage their respective strengths. In some example embodiments, four stereo cameras and one structured-light 3D camera are utilized, as illustrated in the example of FIG. 1, but other embodiments may utilize other camera combinations.

A stereo camera is a type of camera with two or more lenses with a separate image sensor or film frame for each lens. This allows the camera to simulate human binocular vision, and therefore gives it the ability to capture 3D images, a process known as stereo photography. Structured-light 3D cameras, also referred to as a structured-light 3D scanners, project a pattern of light on the subject and measure the deformation of the pattern on the subject. The pattern is projected onto the subject using either a projector or other stable light source. The camera, offset slightly from the pattern projector, looks at the shape of the pattern and calculates the distance of every point in the field of view.

One of the advantages of 3D cameras is their speed. Instead of scanning one point at a time, structured light scanners scan multiple points or the entire field of view at once. Scanning an entire field of view in a fraction of a second reduces or eliminates the problem of distortion from motion.

In some example embodiments, other types of cameras may also be used, such as infrared cameras, depth cameras, ultraviolet cameras, regular two-dimensional (2D) cameras, and the like. Information provided by each camera is combined with the information provided by the other cameras, although some cameras may only provide depth information or color information.

In some example embodiments, the tray 112 includes a pattern 114 used for calibrating the 3D cameras. In some example embodiments, the pattern includes a plurality of circles arranged on a grid pattern. However, other embodiments may utilized other patterns, as long as the pattern is known by the object recognition system 102. For example, the pattern may include one or more rectangles, a photograph, one or more triangles, combinations of different shapes, such as rectangles circles, triangles, and so forth.

It is noted that the pattern does not have to be visible during object recognition, because the pattern is needed for the calibration phase. For example, a user may place a cafeteria tray on the tray 112 and the object recognition system 102 will proceed to identify the objects on the tray 112, such as a bottle, a can, a bag of chips, a plate with a salad, and so forth. In some example embodiments, once the objects are recognized, the system may calculate a total bill based on the respective prices of the identified objects. Further, the system may ask the user to place a salad plate separately on the tray 112 in order to weigh a salad that is charged by weight.

It is noted that the embodiments illustrated in FIG. 3 are examples and do not describe every possible embodiment. Other embodiments may utilize fewer components or additional components. The embodiments illustrated in FIG. 3 should therefore not be interpreted to be exclusive or limiting, but rather illustrative.

Figure 4:
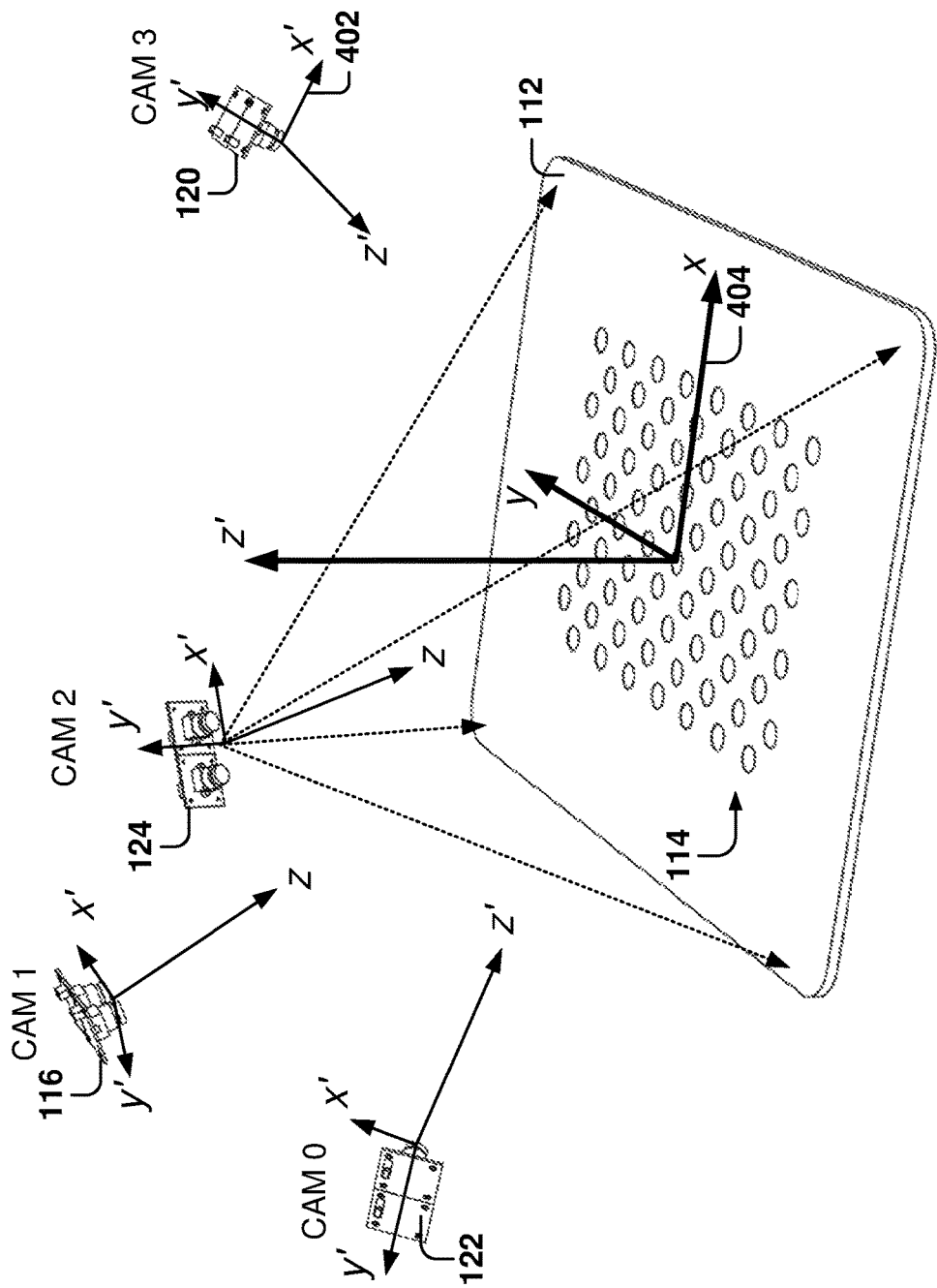
FIG. 4 illustrates the relationship between the common coordinate system and the multiple camera coordinate systems, according to an example embodiment.

FIG. 4 illustrates the relationship between the common coordinate system and the multiple camera coordinate systems, according to an example embodiment. Embodiments provide the ability to use multiple 3D cameras and the cameras may be of different types. Because of the calibration procedure described below, it is possible to combine the information from the multiple cameras (e.g., 116, 120, 122, and 124), even if the cameras are of different types.

In order to map all of the information from the multiple cameras to the same 3D space, a pattern 114 is used for calibrating image data captured by each of the cameras 116, 120, 122, and 124. The pattern allows the system to determine the location of each camera with reference to a common coordinate system 404.

The common coordinate system 404 is a Cartesian coordinate system used as a reference by the system. Object recognition involves translating all of the image capture data to be referenced against the common coordinate system. The common coordinate system 404 includes an origin on the surface of the tray 112, x and y axes perpendicular to each other on the surface of the tray 112, and a z axis perpendicular to the surface of the tray 112. Although embodiments presented herein are described with reference to a Cartesian coordinate system, any other coordinate system may be utilized using the principles described herein, such as a polar coordinate system, a spherical coordinate system, a cylindrical coordinate system, and so forth.

Each camera 116, 120, 122, and 124 includes its own camera coordinate system 402 where the z axis is a vector pointing out in the direction that the camera is taking images, and the x and y axes are on a plane perpendicular to the z axis. When each camera takes an image, the image data includes information for each of the captured pixels, which includes color data (e.g., red (R), green (G), and blue (B) data) and location data (e.g., x, y, x coordinates in the camera coordinate system).

However, the data from each camera cannot be directly combined because the location data is from different camera coordinate systems. The solution is to convert all data to the same common coordinate system 404 and then combine the image data obtained from all of the cameras.

It is noted that almost any image on the surface of the tray 112 may be used as a pattern. The use of a large number of circles that are disposed on a grid is a good pattern because it is relatively easy to identify the location of the circles and also because the disposition of the circles on a grid allows for performing error recovery on image data.

Therefore, each camera takes an image of the tray 112 at about the same time and the image data is analyzed to find the grid. In this example embodiment, the origin for the common coordinate system is centered on the grid, but the origin may be located anywhere else, as long as all cameras use the same origin and axes. In one example embodiment, the grid on the tray determines the x and y axes that are aligned with the parallel lines that outline the periphery of the grid.

Because the cameras are 3D cameras, each point of the image has depth information, and when the pattern circles are found, the system has the distance of the circles to each camera. In some example embodiments, error correction is performed on the image data. 3D data captured by cameras sometimes contains errors, such as depth information for some pixels. The position of the circles on the tray is known, and the fact that the circles are on the same plane may be used to perform error correction to make all of the points on the tray, including the points from the pattern, be in the same plane. Further, to make sure that the circles have distances from each other that match the grid, error correction may be performed by using regression tools for a best fit of the data into points that are on the same plane and according to the pattern, such as by using averages or other regression methods.

After the error correction is performed, if necessary, the image data is transformed from being described with reference to the camera coordinate system 402 to being described with reference to the common coordinate system 404, an operation referred to as a coordinate change. This means that for each pixel, the x', y', and z' coordinates from the camera coordinate system are transformed to x, y, and z values for the common coordinate system 404.

As used herein, a 3D pixel represents a point or a polygon (e.g., a square) in space with a color value and a location value. In addition, the 3D pixels may also be represented as a voxel, which includes a value on a regular grid in a 3D space. In some example embodiments, points and polygons are often explicitly represented by the coordinates of their vertices. In general, polygons are able to efficiently represent simple 3D structures with lots of empty or homogeneously filled space, while voxels are good at representing regularly sampled spaces that are non-homogeneously filled.

In some example embodiments, the coordinate transformation includes performing a rotation and a translation. In some example embodiments, a scale operation might have to be performed if the cameras utilize different units, but if the cameras utilize the same units (e.g., millimeters), then scaling is not performed.

After the image data from all of the cameras goes through the coordinate change, all of the image data is referenced against the same common coordinate system. The image data may then be merged to perform object recognition and create 3D models of objects based on the combination of views of the object from the different cameras. More details on object recognition are provided below with reference to FIGS. 6 and 7.

Further, it is noted that the embodiments are described with reference to a confined space for identifying objects, such as a small, typical checkout counter for grocery or cafeteria items. However, the same principles may be applied to larger spaces, such as a room, a showroom, a street, a building, a stadium, cars on a road, and so forth, as long as a known-pattern may be identified for calibrating the cameras. Further, the pattern does not have to be disposed on a flat surface and the pattern may have a 3D aspect, or there could be multiple patterns spread out through an identified volume (e.g., different patterns on several walls of the room). Further yet, not all cameras need to have sight of the whole area of interest and some cameras may visualize only part of the area of interest. For example, a network of cameras may be used to recognize objects throughout a house or to recognize people walking through the hallways of a building.

Even if multiple types of cameras are being used, it is possible to combine all of the 3D pixel information from all of the cameras when the 3D cameras use a common reference coordinate system. It is possible to combine data from the multiple 3D cameras by utilizing the calibrating pattern and periodic calibrations.

It is noted that the embodiments illustrated in FIG. 4 are examples and do not describe every possible embodiment. Other embodiments may utilize a different number of cameras (e.g., 2, 5, or more), have the cameras placed in different positions with reference to the pattern, use mirrors to obtain more angles on the object, and so forth. In some embodiments, the pattern may have a different grid, (e.g., a triangle, an irregular trapezoid, etc.) The embodiments illustrated in FIG. 4 should therefore not be interpreted to be exclusive or limiting, but rather illustrative.

Figure 5:
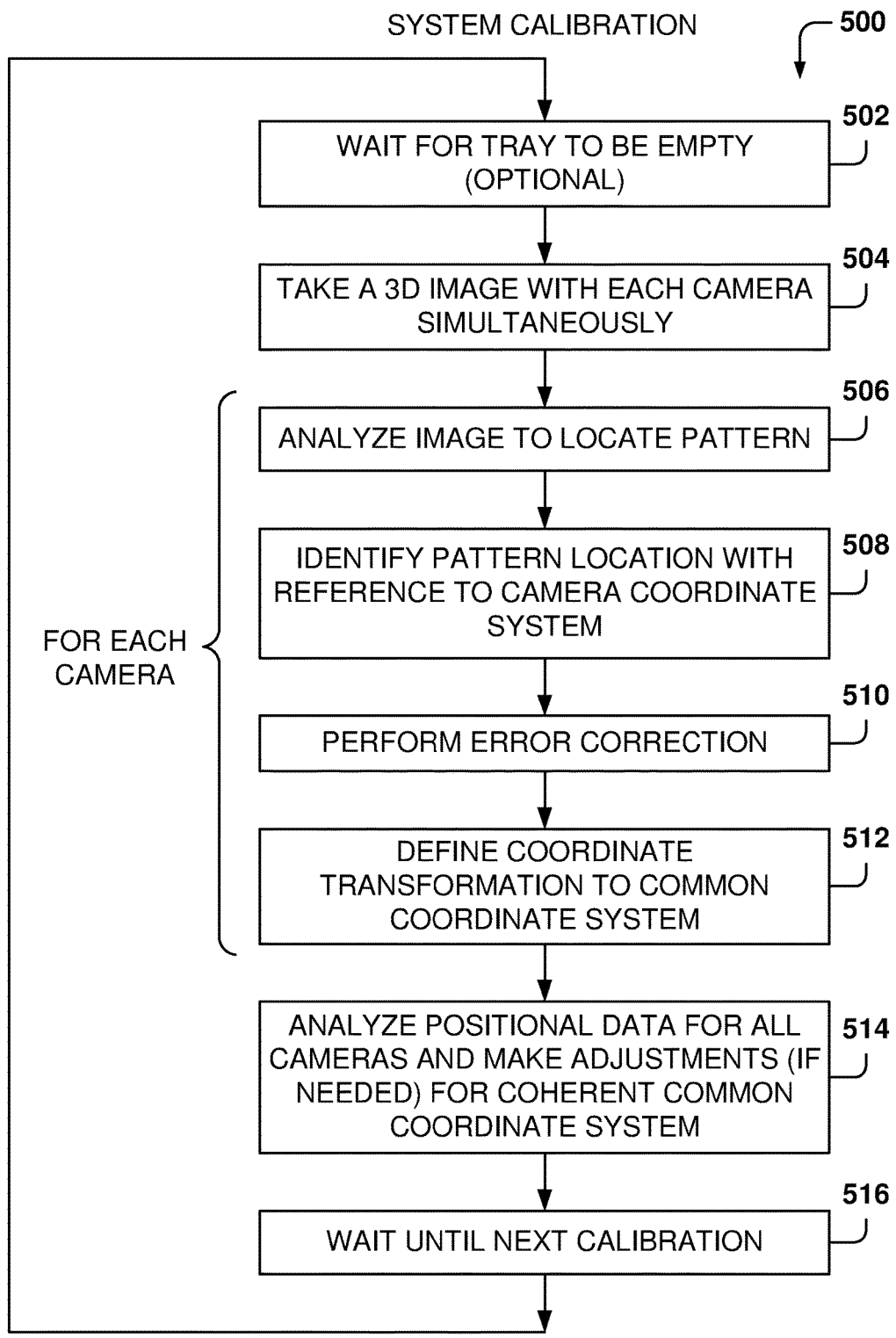
FIG. 5 is a flowchart of a method for calibrating the object-recognition system, according to some example embodiments.

FIG. 5 is a flowchart of a method 500 for calibrating the object-recognition system, according to some example embodiments. While the various operations in this flowchart are presented and described sequentially, one of ordinary skill will appreciate that some or all of the operations may be executed in a different order, be combined or omitted, or be executed in parallel.

At operation 502, the system waits for the tray to be empty before starting the calibration process. This way, the whole pattern is visible to the cameras. In other embodiments, the calibration process takes place even when there is an object on the tray, and only the visible part of the pattern is utilized for calibration.

From operation 502, the method flows to operation 504 where a 3D image is taken by each of the cameras simultaneously. The cameras take the picture at about the same time, although it may not be exactly concurrent, but the picture will be taken within a predetermined time interval, such as a tenth of a second, but other time intervals are also possible, such as in the range from one millisecond to two seconds.

For each camera, operations 506, 508, 510, and 512 are performed. At operation 506, the image data from the 3D image taken by the camera is analyzed to identify the location of the pattern in the image data. From operation 506, the method flows to operation 508 where the pattern location is identified with reference to the camera coordinate system.

At operation 510, error correction is performed, if necessary. As described above, error correction may take place if the image data for the location of the pattern does not exactly fall within the same plane in the pattern or if any of the image data is not as expected and known from the real world.

At operation 512, a coordinate transformation function is defined for the camera in order to convert image data of images taken by the camera to the common coordinate system.

At operation 514, the positional data for all of the cameras is analyzed and adjustments are made (if needed) to define a coherent common coordinate system with valid coordinate transformation functions for all of the cameras, such that when image data is combined, the image data referring to a particular pixel would be consistent among all of the cameras.

From operation 514, the method flows to operation 516 where the system waits for a predetermined amount of time until the next calibration is performed. It is noted that in the real world, the camera position may suffer slight adjustments over time, such as by contraction or expansion due to temperature changes or movement of the system because of the interaction of users with the system (e.g., by running a card through the card reader or pressing keys on a keyboard). This is why it is important to perform continuous calibration so the image data stays cohesive over time and object recognition is not impaired. Continuous calibration allows the camera system to always be synchronized and to create 3D models for objects being recognized.

Figure 6:
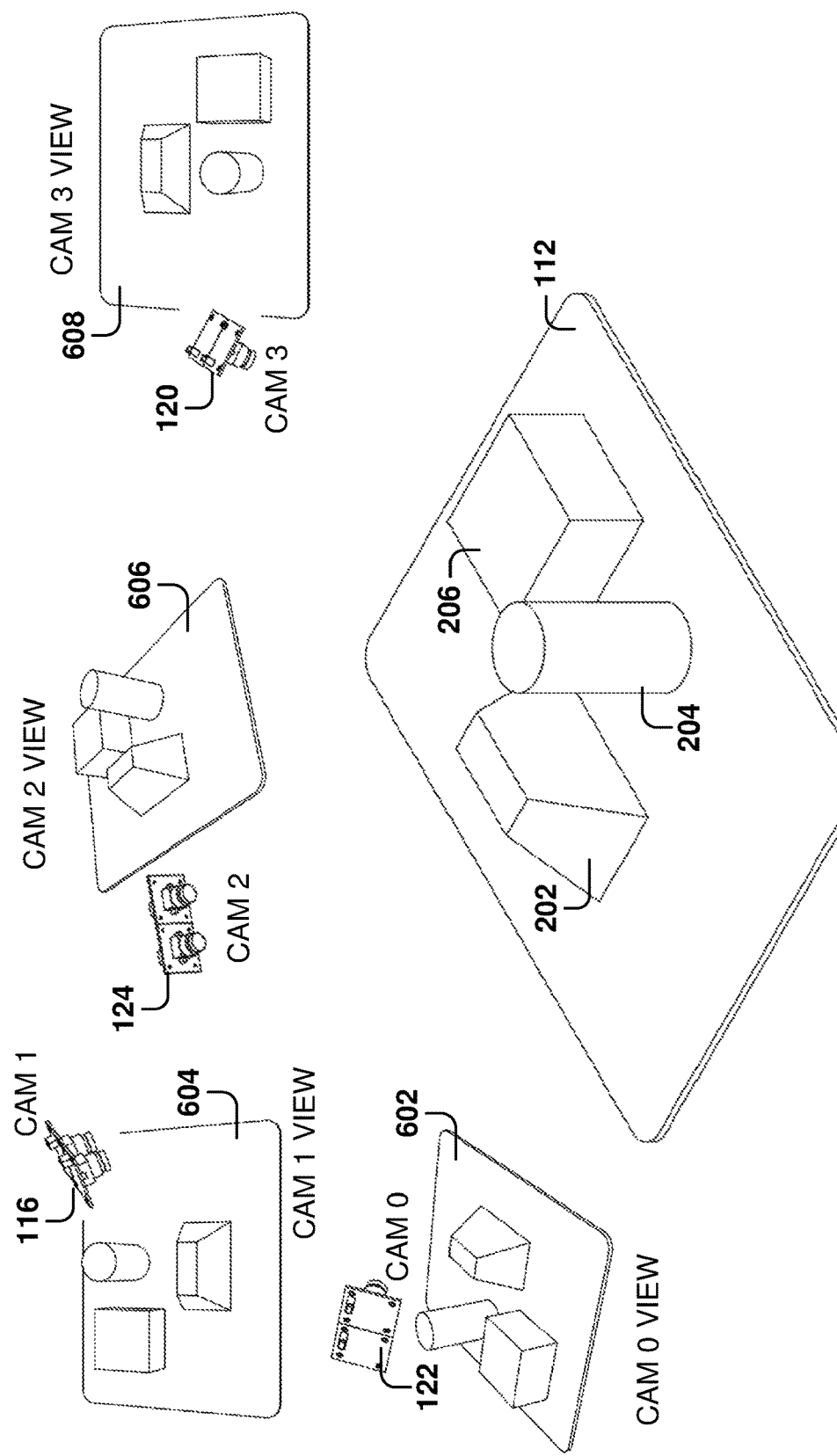
FIG. 6 illustrates how an object is recognized based on the different views of the object, according to some example embodiments.

FIG. 6 illustrates how an object is recognized based on the different views of the object, according to some example embodiments. In this example embodiment, three objects 202, 204, and 206 are placed on the tray 112 for recognition by four cameras 116, 120, 122, 124. The system separates the objects before attempting to recognize what each object is.

For people, it is very easy to visually separate the objects and identify what part of the volume each object occupies. However, this is a difficult task for a computer. After taking 3D images of the space over the tray 112, the computer has a collection of pixels having a color (e.g., red, green, blue (RGB) values) and a location (x, y, z values). Since objects may have multiple colors, separating them by their color is not a straightforward proposition, especially when the objects are touching. If the objects are not touching, a first approach to separation is to identify an object as a collection of pixels that are not in contact with another collection of pixels. However, this approach is not possible when the objects are touching or when an object is in the way of the other object.

Having 3D image information allows the system to separate the objects because the system has not only the color information but also the location information. Knowing the location helps because the surfaces of an object have points that are next to each other so it is easier to identify surfaces on the object. On the other hand, if only color information is examined, it is not straightforward to determine if a given pixel belongs to an object near the camera or the pixel belongs to an object that is further away from the camera.

Once the system separates the objects 202, 204, and 206, each item is evaluated separately to determine its identity. For simplicity of description purposes, object recognition is described with reference to four cameras, but the same principles may be used when there is a different number of cameras.

Each of the cameras has a different view of the objects. As shown, camera 116 provides a view 604 of the objects, camera 124 provides view 606, camera 120 provides view 608, and camera 122 provides view 602. Views 604 and 608 provide a top perspective of the objects, while views 602 and 606 provide lateral views of the objects.

Because each camera has a coordinate transformation function to convert data into the common coordinate system, the image data captured for all of the cameras can be combined to generate respective 3D models of the objects 202, 204, and 206. Combining the data for each object into a single model facilitates object recognition. For example, the name of the product may not be completely visible to any camera, but the combination model may be able to "see" the complete name of the product in the 3D model.

If there is a point that is visible from two cameras, when combining the information from both cameras, that point will have the same location information from both cameras because of the common coordinate system. In addition, the color information may vary slightly due to the different information provided by each camera, but the color information should be similar and a representative color will be selected for the combination.

Combining the image data includes combining pixel data for each of the pixels obtained from each of the cameras and also includes identifying characteristics of the object, such as surfaces, lines separating two surfaces, and so forth. By identifying the surfaces (e.g., planes), the combination will include the surfaces of the object. In some example embodiments, the surfaces are defined by polygons that include all of the points of the surface, but other embodiments may use different representations.

Additionally, it is possible to perform validation on the different pixels by identifying how the pixels fit within each of the identified surfaces or characteristics of the object. It provides a consistency test by making sure that the pixels on the surface of the object provide continuous surfaces, as real life objects do. Further, matching the surfaces and pixels identified by multiple cameras confirms that the cameras are properly aligned.

If the calibration is correct, a point observed by one camera would have the same color and location as the same point observed by the other cameras. The RGB values may vary slightly because of variability of each camera and the lighting environment. The resulting RGB used for the combination may be calculated based on the values from the different cameras for that pixel (e.g., by calculating the average) and based on the RGB values of the surrounding pixels in order to provide color consistency in surfaces with uniform coloring.

Separating surfaces is easier with 3D data. For example, if there is a first flower in a first plane in front of a second flower in a further plane (e.g., 5 meters behind), where the first flower covers some of the second flower from the camera, it is difficult for the computer to separate the flowers with only 2D information. However, with 3D information, namely the location of the pixels, it is much easier to separate the data of the first flower from the data of the second flower because the computer knows the respective location of the corresponding pixels.

Similarly, it is easier to separate objects on the tray 112 when location information is available, even if the two objects are touching or one is in front of the other. The additional location information clarifies that one object is further from the other, so separating the objects is easier than without having location information.

After combining the information, the system has a 3D model of the object, including all of the visible points from any camera, including their location, and all with reference to the common coordinate system.

Figure 7:
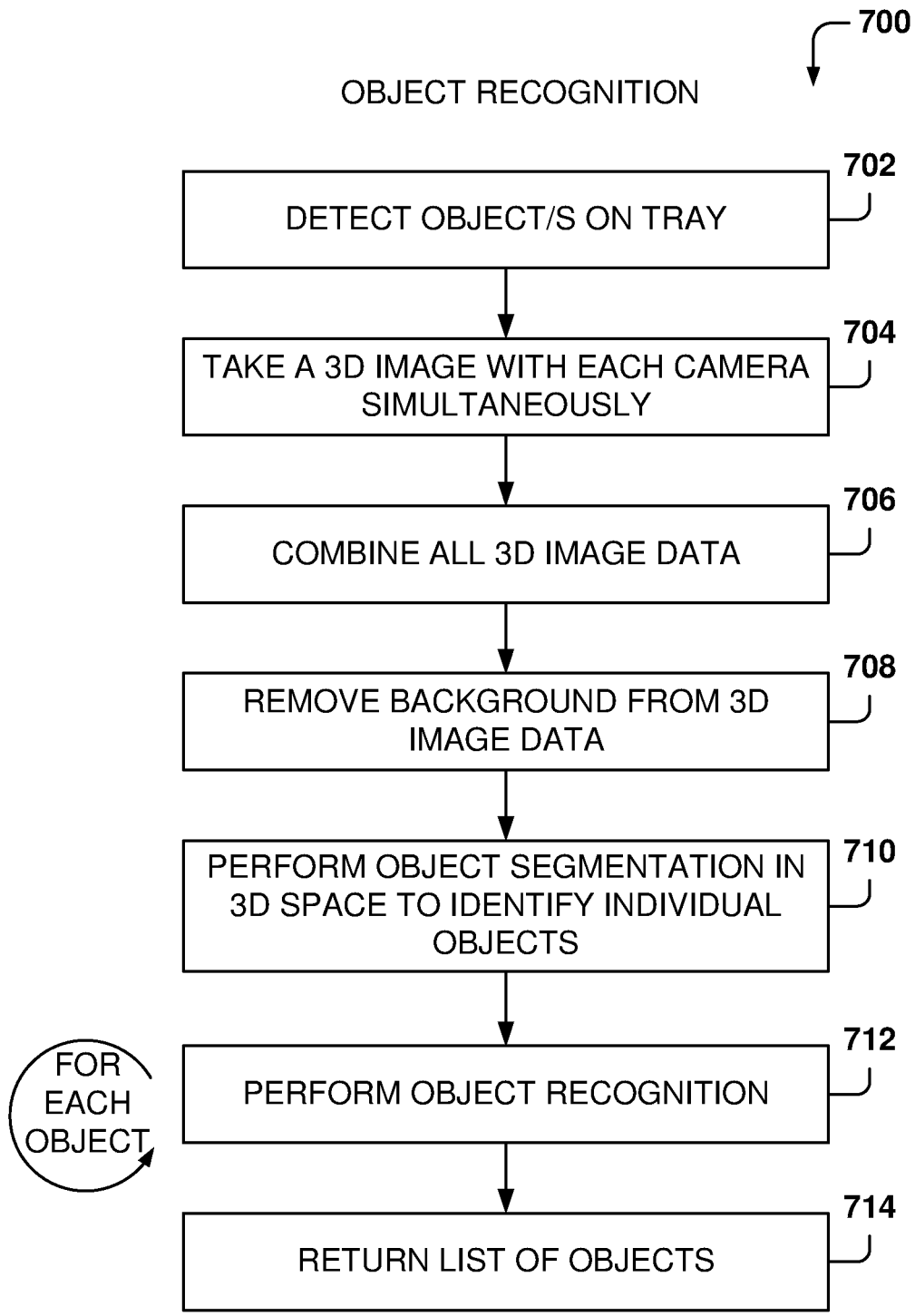
FIG. 7 is a flowchart of a method for recognizing an object, according to some example embodiments.

FIG. 7 is a flowchart of a method 700 for recognizing an object, according to some example embodiments. While the various operations in this flowchart are presented and described sequentially, one of ordinary skill will appreciate that some or all of the operations may be executed in a different order, be combined or omitted, or be executed in parallel.

At operation 702, one or more objects are detected on the tray. In some example embodiments, the object is detected by a proximity sensor, a light sensor, by taking periodic pictures of the tray and examining their content, or by some other type of sensor.

At operation 704, a 3D image is taken by each of the cameras at about the same time. The cameras may take the same picture simultaneously, or within a predetermined period of time, such as a period of time in the range of one millisecond to two seconds or more.

From operation 704, the method flows to operation 706 were all of the 3D image data captured in operation 704 is combined to obtain a combined 3D image data, which is a single 3D model of the view for the cameras. The previously-performed calibration facilitates combining the data because the data has the common coordinate system as a reference.

From operation 706, the method flows to operation 708, where the background is removed from the 3D image data. At operation 710, object segmentation is perform in the 3D space to identify the individual objects present in the 3D image data. The result of the object segmentation is the separation of the multiple objects (if there is more than one object), where each object has its own 3D model. It is noted that combining the 3D image data for each object includes, in some example embodiments, identifying the surfaces of the object and ensuring that the surfaces are joined together to obtain the model for the 3D object. Separating the objects makes object recognition easier because the computer system does not have to account for extraneous data that does not belong to a particular object.

From operation 710, the method flows to operation 712, where for each object, object recognition is perform based on the 3D image data for the object. In some example embodiments, object recognition is performed by a machine learning algorithm that has been trained with 3D models of a plurality of objects. The 3D model includes all of the known information for the object, including all of the sites that are visible to any of the cameras. Each point includes color as well as location information, which facilitates the object recognition by the machine-learning program.

Performing object recognition in 3D is more accurate than object recognition in 2D in environments where the objects may be positioned differently with reference to the camera. For example, in a semiconductor test environment where a semiconductor chip is always presented in the same position, and at the same distance, from a camera, the 2D object recognition or testing, may be effective. However, in a situation where objects may be in different positions, such as in a grocery checkout stand, 2D object recognition is much more complicated because the system has to be able to recognize the object from any angle, which requires data for one particular object in many different positions. This grows geometrically the number of alternatives for recognizing objects.

When performing object recognition in 3D, there is only one model for the 3D object, so finding the identity of the object requires matching one object in the database, and not one of many 2D views possible for the object.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data in order to make data-driven predictions or decisions expressed as outputs or assessments.

In some example embodiments, different machine-learning tools may be used. For example, Logistic Regression (LR), Naive-Bayes, Random Forest (RF), neural networks (NN), matrix factorization, and Support Vector Machines (SVM) tools may be used for object identification, but other machine-learning tools may also be utilized.

In general, there are two types of problems in machine learning: classification problems and regression problems. Classification problems aim at classifying items into one of several categories (for example, is this object an apple or an orange?). Regression algorithms aim at quantifying some items (for example, by providing a value that is a real number). In some example embodiments, the machine-learning algorithm provides the identity of the object on the tray. In another example embodiment, the machine-learning algorithm provides a ranking score (e.g., a number from 1 to 100) to provide a probability that the object matches one or more of the objects in the database of objects. The machine-learning algorithms utilize training data to find correlations among identified features that affect the outcome. The features may include shape, size, longest dimension, shortest dimension, typical orientation (e.g., a salad on a plate is mostly flat when compared to a bottle of beer that is mostly vertical), color or colors, light reflectivity, frequency of purchases by users, and so forth.

Training data is used to train the machine-learning algorithm, and the training data may include a plurality of views of objects and an entry indicating the identity of the object. The machine-learning tool appraises the value of the features as they correlate to the training data, and the result of the training is a trained machine-learning program, which may be used for object identification. At operation 714, the object-recognition program returns a list of one more objects identified on the tray.

Figure 8:
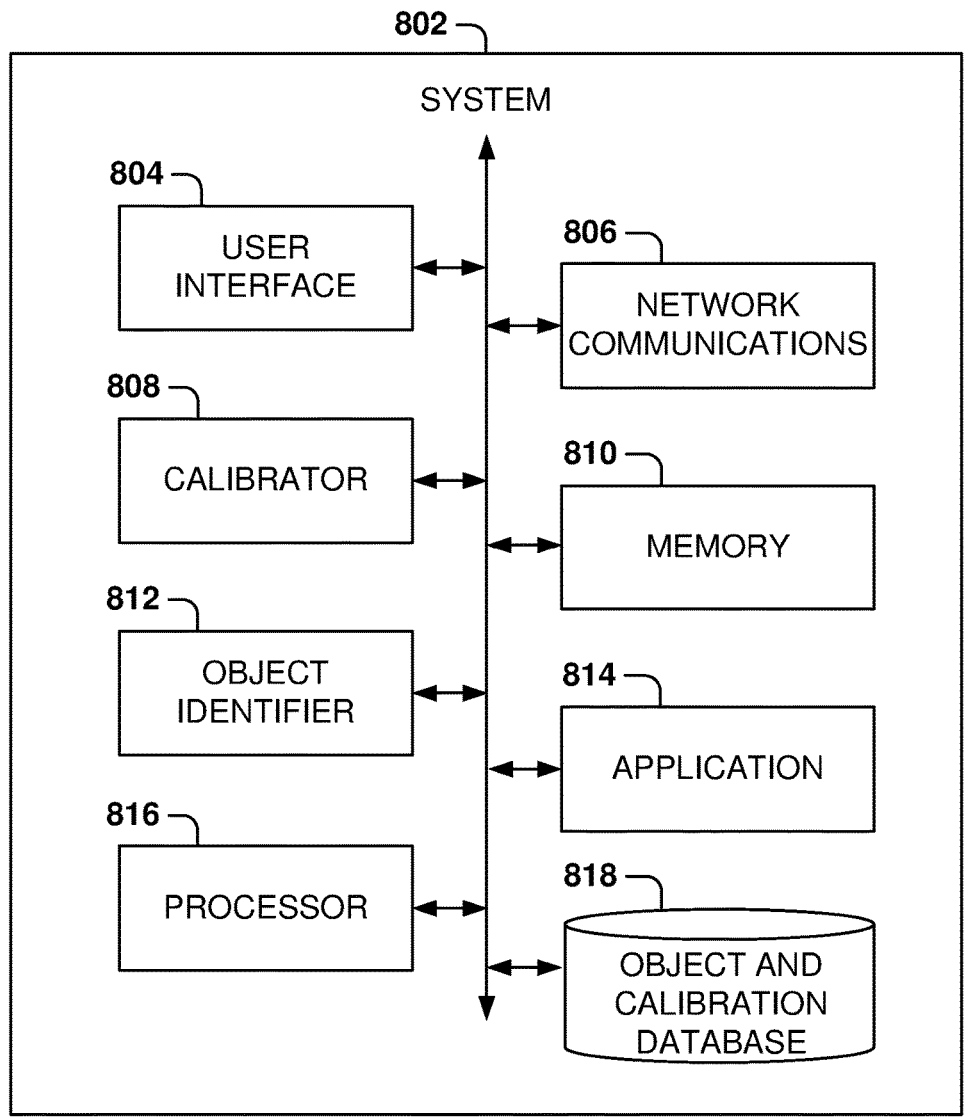
FIG. 8 illustrates some of the system components, according to some example embodiments.

FIG. 8 illustrates some of the system components, according to some example embodiments. In some example embodiments, system 802 includes a user interface 804, a calibrator 808, an object identifier 812, a processor 816, network communications 806, a memory 810, one or more applications 814, and an object and calibration database 818.

The user interface 804 creates the user interface data for presenting the user interface at a display, a client device, or a server. For example, the user interface 804 may include a user interface for configuring the object recognition system, for entering system data, for presenting identification of objects, for presenting a bill to a user, for communicating a message to the user (e.g., place the salad plate on the tray by itself for weighing), and so forth.

Network communications 806 provide communications to other devices, such as communication with the server, or another client, or a smart phone or the user, and so forth. The calibrator 808 is used to perform calibration of the object recognition system, such as the calibration illustrated with reference to FIGS. 4 and 5.

The object identifier 812 performs object recognition on the objects placed on the tray, such as the example described above with reference to FIGS. 6 and 7. In some example embodiments, the object recognition is performed by a machine-learning program, but other types of object recognition may be utilized based on the 3D data capture for each of the objects.

The memory 810 contains program instructions for the different programs and also may be used by processor 816 during operation to store program data. One or more applications 814 perform different system operations, such as entering or updating price information, adding or deleting items to the object database, communicating with a server or other object recognition systems, uploading or downloading system configuration, and so forth.

The processor 816 executes the program instructions for the different programs, and the object and calibration database 818 stores object data (e.g., 3D models for the configured objects) and calibration data, such as calibration data obtained as described above with reference to FIG. 4. Other databases (not shown) may also be included to store other types of data, such as price lists, user accounts, credit card server information, support server information, and so forth.

It is noted that the embodiments illustrated in FIG. 8 are examples and do not describe every possible embodiment. Other embodiments may utilize additional components, combine the functionality of two more programs into a single program, have fewer components, and so forth. The embodiments illustrated in FIG. 8 should therefore not be interpreted to be exclusive or limiting, but rather illustrative.

Figure 9:
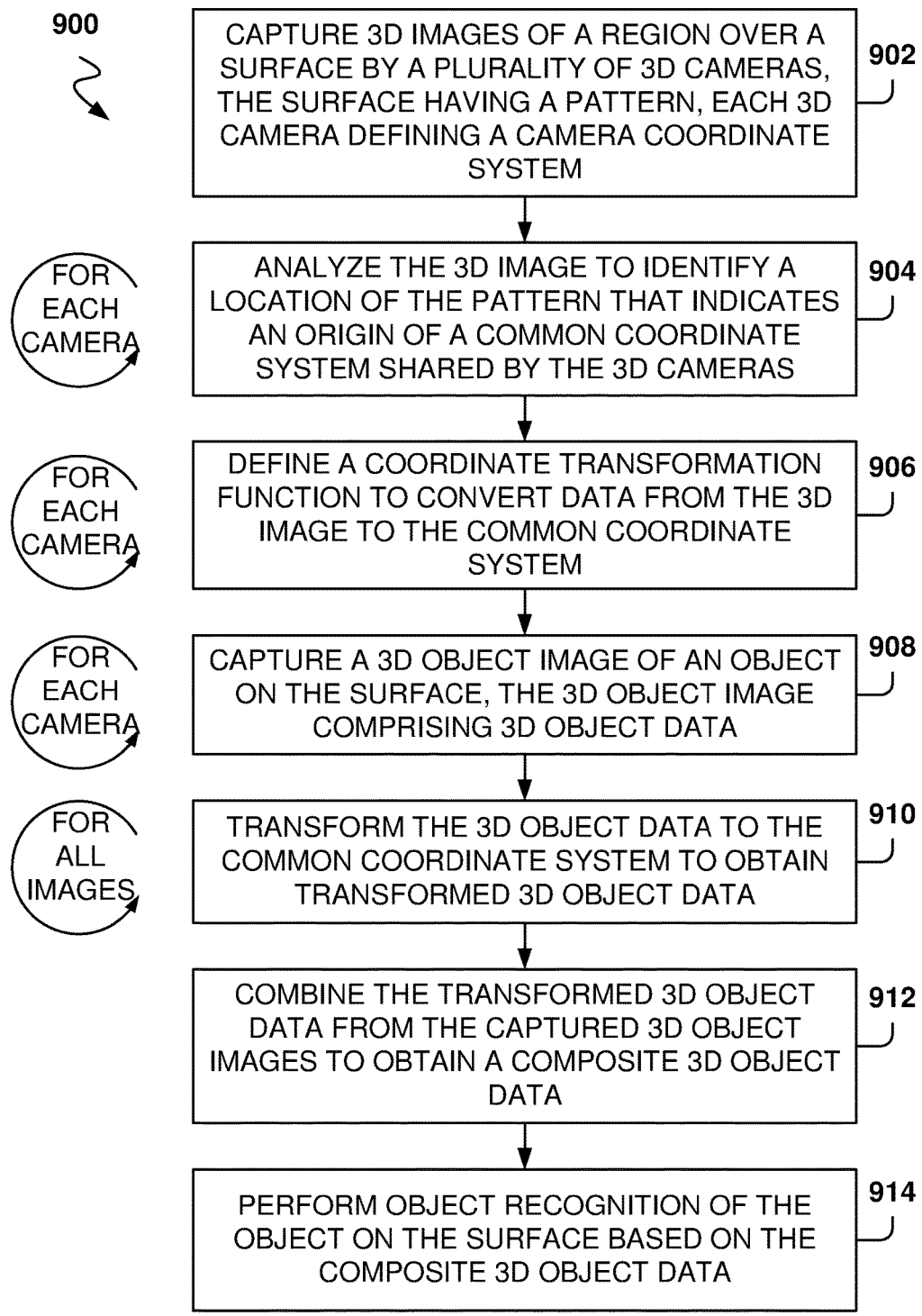
FIG. 9 is a flowchart of a method for object recognition performed by electronic devices, according to some example embodiments.

FIG. 9 is a flowchart of a method 900 for object recognition performed by electronic devices, according to some example embodiments. While the various operations in this flowchart are presented and described sequentially, one of ordinary skill will appreciate that some or all of the operations may be executed in a different order, be combined, or be executed in parallel.

At operation 902, 3D images of a region over a surface are captured by a plurality of 3D cameras. The surface has a pattern and each 3D camera from the plurality of 3D cameras defines a camera coordinate system. From operation 902, the method 900 flows to operation 904, where, for each camera, the 3D image is analyzed to identify a location of the pattern that indicates an origin of a common coordinate system shared by the 3D cameras.

From operation 904, the method 900 flows to operation 906, where, for each camera, a coordinate transformation function is defined to convert data from the 3D image to the common coordinate system. From operation 906, the method 900 flows to operation 908 for capturing, by each of the plurality of 3D cameras, a 3D object image of an object on the surface. The 3D object image comprises 3D object data.

From operation 908, the method 900 flows to operation 910, where, for the captured 3D object images, the 3D object data is transformed to the common coordinate system, resulting in transformed 3D object data. From operation 910, the method 900 flows to operation 912 for combining the transformed 3D object data from the captured 3D object images to obtain a composite 3D object data. At operation 914, the one or more processors perform object recognition of the object on the surface based on the composite 3D object data.

In some examples, the camera coordinate system includes an origin at a position of the camera, x, y, and z axes, with the z axis pointing in a direction of a view by the camera, and the common coordinate system includes a common origin on a point of the surface and a common z axis perpendicular to the surface.

In some aspect, the coordinate transformation function transforms a location of a pixel in the camera coordinate system to a location of the pixel in the common coordinate system.

In another example, combining the transformed 3D object data further includes combining pixel data from the captured 3D object images to obtain the composite 3D object data that defines pixel information and location of each pixel for the object.

In some example embodiments, combining the transformed 3D object data further includes removing pixels from a background that includes the surface.

In some examples, the pattern includes a plurality of circles arranged on a grid pattern.

In some aspects, the plurality of 3D cameras includes one or more 3D stereo cameras and one or more structured light imaging cameras.

In one example, the method 900 further includes, for each camera, defining error correction for captured images based on the captured 3D image and the location of the pattern.

In some embodiments, the object recognition is performed by a machine learning program based on the composite 3D object data.

In some embodiments, the data from the 3D image includes a plurality of pixels, with each pixel having corresponding values for x coordinate, y coordinate, z coordinate, red color value, green color value, and blue color value.

Figure 10:
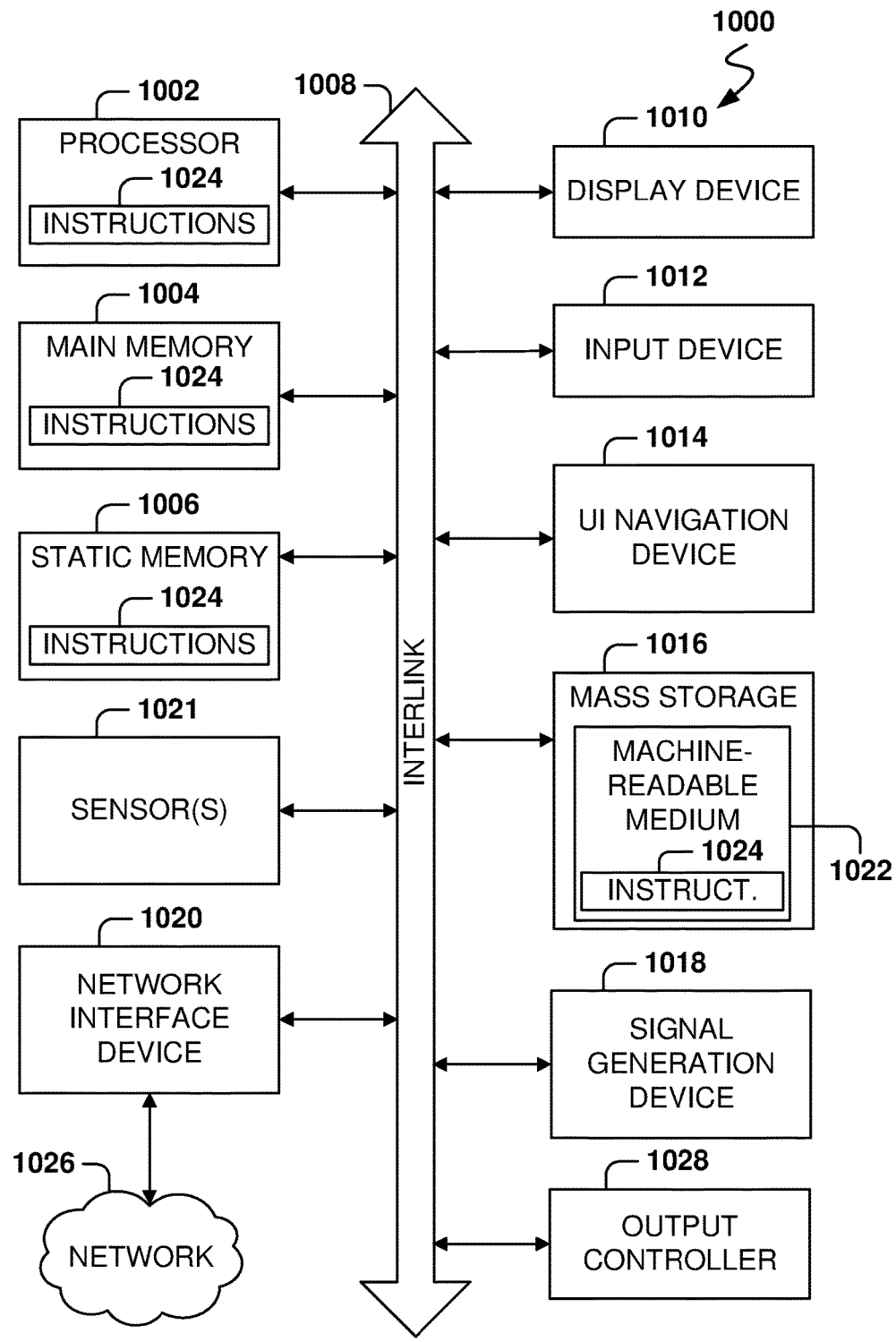
FIG. 10 is a block diagram illustrating an example of a machine upon which one or more example embodiments may be implemented.

FIG. 10 is a block diagram illustrating an example of a machine upon which one or more example embodiments may be implemented. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine 1000 is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1000 may include a hardware processor 1002 (e.g., a central processing unit (CPU), a graphics processing unit (GPU), a hardware processor core, or any combination thereof), a main memory 1004, and a static memory 1006, some or all of which may communicate with each other via an interlink (e.g., bus) 1008. The machine 1000 may further include a display device 1010, an alphanumeric input device 1012 (e.g., a keyboard), and a user interface (UI) navigation device 1014 (e.g., a mouse). In an example, the display device 1010, input device 1012 and UI navigation device 1014 may be a touch screen display. The machine 1000 may additionally include a mass storage device (e.g., drive unit) 1016, a signal generation device 1018 (e.g., a speaker), a network interface device 1020, and one or more sensors 1021, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1016 may include a machine-readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute machine-readable media.

While the machine-readable medium 1022 is illustrated as a single medium, the term "machine-readable medium" may include a single medium or multiple media (e.g., a centralized or distributed database, and/or associated caches and servers) configured to store the one or more instructions 1024.

The term "machine-readable medium" may include any medium that is capable of storing, encoding, or carrying instructions 1024 for execution by the machine 1000 and that cause the machine 1000 to perform any one or more of the techniques of the present disclosure, or that is capable of storing, encoding or carrying data structures used by or associated with such instructions 1024. Non-limiting machine-readable medium examples may include solid-state memories, and optical and magnetic media. In an example, a massed machine-readable medium comprises a machine-readable medium 1022 with a plurality of particles having invariant (e.g., rest) mass. Accordingly, massed machine-readable media are not transitory propagating signals. Specific examples of massed machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device 1020 utilizing any one of a number of transfer protocols (e.g., frame relay, IP, TCP, user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, P2P networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions 1024 for execution by the machine 1000, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising, during an active session:
   capturing, by a plurality of three-dimensional (3D) cameras in a top section of a checkout apparatus, 3D images of a region over a surface of a base in the checkout apparatus, the surface comprising a pattern, and wherein the checkout apparatus comprises a post section connecting the base to the top section in a spaced relationship, each 3D camera from the plurality of 3D cameras defining a camera coordinate system, each 3D image comprising pixel data having three coordinates in the camera coordinate system, wherein the 3D images comprise 3D pixel object data of an object on the surface and the pattern;
   for each 3D camera, analyzing, by one or more processors, the 3D image to determine a location of the pattern relative to the respective 3D camera, wherein the pattern is indicates a common 3D coordinate system shared by the 3D cameras;

for each 3D camera, calibrating the respective 3D camera during the active session, comprising determining a coordinate transformation function to convert pixel data in the 3D image from the camera coordinate system of the 3D camera to the common 3D coordinate system shared by the 3D cameras, the coordinate transformation function being determined based on the identified location of the pattern in the respective 3D image and the common 3D coordinate system;

for the captured 3D images, transforming, by the one or more processors, the 3D pixel object data to the common 3D coordinate system, using the coordinate transformation function, to obtain transformed 3D pixel object data, wherein the transformed 3D pixel object data for the plurality of 3D cameras is defined for the same common 3D coordinate system;

combining, by the one or more processors, the transformed 3D pixel object data from the captured 3D images to obtain a composite 3D pixel object data for the object; and performing, by the one or more processors, object recognition of the object on the surface based on an appearance of the object described in the composite 3D pixel object data.

2. The method as recited in claim 1, wherein the camera coordinate system includes an origin at a position of the 3D camera, x, y, and z axes, the z axis pointing in a direction of a view by the 3D camera, wherein the common 3D coordinate system includes a common origin on a point of the surface and a common z axis perpendicular to the surface.

3. The method as recited in claim 1, wherein the coordinate transformation function includes a coordinate change a location of a pixel in the camera coordinate system to a location of the pixel in the common 3D coordinate system.

4. The method as recited in claim 1, wherein combining the transformed 3D pixel object data further comprises:
combining the transformed 3D object pixel data from the captured 3D images to obtain the composite 3D pixel object data that defines pixel information and 3D location of each pixel for the object, the combining being based on the coordinates of the transformed 3D object pixel data provided by each 3D camera.

5. The method as recited in claim 1, further comprising:
removing, from the composite 3D pixel data, pixels of the surface before performing the object recognition.

6. The method as recited in claim 1, wherein the pattern includes a plurality of circles arranged on a grid pattern.

7. The method as recited in claim 1, wherein the plurality of 3D cameras includes one or more 3D stereo cameras and one or more structured light imaging cameras.

8. The method as recited in claim 1, further comprising:
for each 3D camera, defining error correction for captured images based on the captured 3D image and the location of the pattern.

9. The method as recited in claim 1, wherein the object recognition is performed by a machine learning algorithm based on the composite 3D pixel object data, the machine learning algorithm being trained with 3D models of a plurality of objects, the 3D models having a plurality of features that comprise shape, size, longest dimension, and color.

10. The method as recited in claim 1, wherein the data from the 3D image comprises a plurality of pixels, each pixel having corresponding values for x coordinate, y coordinate, z coordinate, red color value, green color value, and blue color value.

11. A system comprising:
a base having a surface, the surface comprising a pattern;
a top section;
a post section supporting the top section in a spaced relationship relative to the base;
a plurality of three-dimensional (3D) cameras, in the top section, for capturing 3D images of a region over the surface and below the top section, each 3D camera from the plurality of 3D cameras defining a camera coordinate system, wherein each 3D image comprises 3D pixel object data of an object on the surface and the pattern;
a memory comprising instructions; and
one or more computer processors, wherein the instructions, when executed by the one or more computer processors, cause the one or more computer processors to perform operations comprising, during an active session:
for each 3D camera, analyzing the 3D image to determine a location of the pattern that indicates an origin of a common 3D coordinate system shared by the 3D cameras;
for each 3D camera, calibrating the respective 3D camera during the active session, comprising determining a coordinate transformation function to convert pixel data in the 3D image from the camera coordinate system of the 3D camera to the common 3D coordinate system shared by the 3D cameras, the coordinate transformation function being determined based on a location of the origin relative to the respective 3D camera, wherein the location of the origin is determined based on the identified location of the pattern in the 3D image;
for the captured 3D images, transforming the 3D pixel object data to the common 3D coordinate system, using the coordinate transformation function, to obtain transformed 3D pixel object data, wherein the transformed 3D pixel object data for the plurality of 3D cameras is defined for the same common 3D coordinate system;
combining the transformed 3D pixel object data from the captured 3D images to obtain a composite 3D pixel object data for the object; and
performing object recognition of the object on the surface based on an appearance of the object described in the composite 3D pixel object data.

12. The system as recited in claim 11, wherein the camera coordinate system includes an origin at a position of the 3D camera, x, y, and z axes, the z axis pointing in a direction of a view by the 3D camera, wherein the common 3D coordinate system includes a common origin on a point of the surface and a common z axis perpendicular to the surface, wherein the coordinate transformation function includes a coordinate change of the pixel data from the camera coordinate system to the common 3D coordinate system.

13. The system as recited in claim 11, wherein the coordinate transformation function includes a coordinate change a location of a pixel in the camera coordinate system to a location of the pixel in the common 3D coordinate system.

14. The system as recited in claim 11, wherein combining the transformed 3D pixel object data further comprises:
combining the transformed 3D object pixel data from the captured 3D images to obtain the composite 3D pixel object data that defines pixel information and 3D location of each pixel for the object, the combining being based on the coordinates of the transformed 3D object pixel data provided by each 3D camera.

15. The system as recited in claim 11, wherein the instructions further cause the one or more computer processors to perform operations comprising:
  removing, from the composite 3D pixel data, pixels of the surface before performing the object recognition.

16. A non-transitory machine-readable storage medium including instructions that, when executed by a machine, cause the machine to perform operations comprising, during an active session:
  capturing, by a plurality of three-dimensional (3D) cameras in a top section of a checkout apparatus, 3D images of a region over a surface of a base in the checkout apparatus, the surface comprising a pattern, wherein the checkout apparatus comprises a post section connecting the base to the top section in a spaced relationship, each 3D camera from the plurality of 3D cameras defining a camera coordinate system, each 3D image comprising pixel data having three coordinates in the camera coordinate system, wherein the 3D images comprise 3D pixel object data of an object on the surface and the pattern;
  for each 3D camera, analyzing, by one or more processors, the 3D image to determine a location of the pattern relative to the respective 3D camera, wherein the pattern is associated with a common 3D coordinate system shared by the 3D cameras;
  for each 3D camera, calibrating the respective 3D camera during the active session, comprising determining a coordinate transformation function to convert pixel data in the 3D image from the camera coordinate system of the 3D camera to the common 3D coordinate system shared by the 3D cameras, the coordinate transformation function being determined based on the identified pattern in the respective 3D image and the common 3D coordinate system;
  for the captured 3D images, transforming, by the one or more processors, the 3D pixel object data to the common 3D coordinate system, using the coordinate transformation function, to obtain transformed 3D pixel object data, wherein the transformed 3D pixel object data for the plurality of 3D cameras is defined for the same common 3D coordinate system;
  combining, by the one or more processors, the transformed 3D pixel object data from the captured 3D images to obtain a composite 3D pixel object data for the object; and
  performing, by the one or more processors, object recognition of the object on the surface based on an appearance of the object described in the composite 3D pixel object data.

17. The machine-readable storage medium as recited in claim 16, wherein the camera coordinate system includes an origin at a position of the 3D camera, x, y, and z axes, the z axis pointing in a direction of a view by the 3D camera, wherein the common 3D coordinate system includes a common origin on a point of the surface and a common z axis perpendicular to the surface, wherein the coordinate transformation function includes a coordinate change of the pixel data from the camera coordinate system to the common 3D coordinate system.

18. The machine-readable storage medium as recited in claim 16, wherein the coordinate transformation function includes a coordinate change a location of a pixel in the camera coordinate system to a location of the pixel in the common 3D coordinate system.

19. The machine-readable storage medium as recited in claim 16, wherein combining the transformed 3D pixel object data further comprises:
  combining the transformed 3D object pixel data from the captured 3D images to obtain the composite 3D pixel object data that defines pixel information and 3D location of each pixel for the object, the combining being based on the coordinates of the transformed 3D object pixel data provided by each 3D camera.

20. The machine-readable storage medium as recited in claim 16, wherein the machine further performs operations comprising:
  removing, from the composite 3D pixel data, pixels of the surface before performing the object recognition.

21. The method as recited in claim 1, wherein the object is in use on a cafeteria tray placed on the surface, wherein the 3D images of the object for object recognition are captured while the cafeteria tray covers the pattern.

22. The method as recited in claim 1, wherein determining the coordinate transformation function comprises:
  determining a location of each 3D camera with reference to the common 3D coordinate system.

23. The method as recited in claim 1, further comprising:
  identifying multiple food items on the surface;
  capturing 3D images of the plurality of food items; and
  separating the plurality of food items based on 3D pixel information to identify collections of 3D pixels not touching other collections of 3D pixels in the 3D space.

* * * * *

UNITED STATES PATENT AND TRADEMARK OFFICE
CERTIFICATE OF CORRECTION

PATENT NO. : 10,467,454 B2
APPLICATION NO. : 15/497730
DATED : November 5, 2019
INVENTOR(S) : Abhinai Srivastava and Mukul Dhankhar It is certified that error appears in the above-identified patent and that said Letters Patent is hereby corrected as shown below:

On the Title Page

Column 2, Item (57) Abstract, Line 12, Delete "The" and insert --Further, the-- therefor In the Claims Column 16, Line 66, In Claim 1, after "pattern", delete "is"

Signed and Sealed this
Twenty-eighth Day of March, 2023

Katherine Kelly Vidal
*Director of the United States Patent and Trademark Office*